Jan. 6, 1953 R. R. AUSTIN 2,624,701
ELECTROLYTIC TITRATION CELL
Filed April 19, 1948 2 SHEETS—SHEET 2

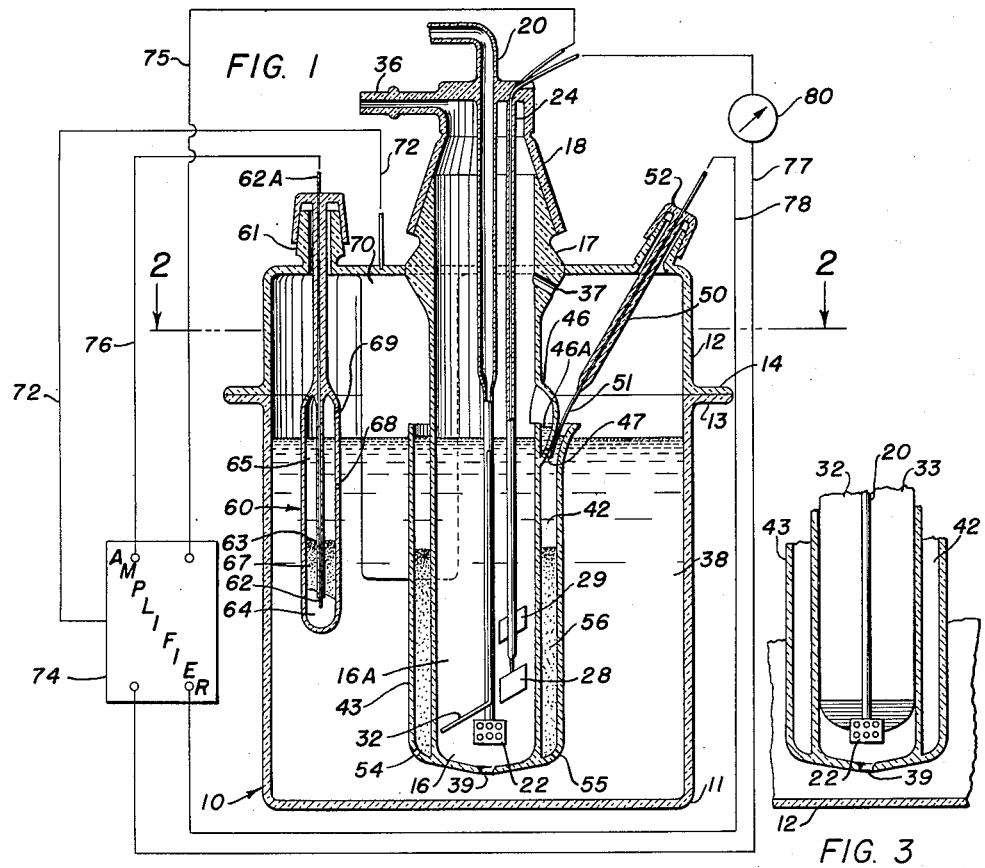
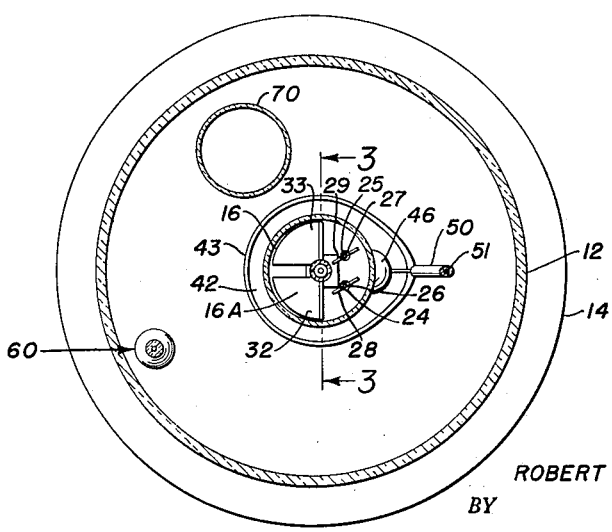

INVENTOR.
ROBERT R. AUSTIN
BY
*James B. Christie*
ATTORNEY

Patented Jan. 6, 1953

2,624,701

UNITED STATES PATENT OFFICE 2,624,701

ELECTROLYTIC TITRATION CELL

Robert R. Austin, Pasadena, Calif., assignor to Consolidated Engineering Corporation, Pasadena, Calif., a corporation of California Application April 19, 1948, Serial No. 21,815

21 Claims. (Cl. 204—195)

This invention is concerned with titration and particularly with automatic titration in which the content of a constituent in a fluid is determined by reacting the constituent and a titrating agent electrically generated in situ in the reaction zone. The end point of such reaction is determined potentiometrically, i. e. a D. C. potential is developed which varies as the excess of one of the reactants present in the zone. The current input to the electrolysis which generates the titrating agent is varied responsive to changes in this D. C. potential, so that the apparatus automatically adjusts itself to the end point. A measure of the current introduced into electrolysis constitutes a measure of the quantity of titrating agent required and hence of the content or quantity of the constituent with which the titrating agent reacts.

It has been proposed heretofore in U. S. patent application, Serial No. 662,453, filed April 16, 1946, by Philip A. Schaffer, to carry out automatic titration as described above. The Schaffer apparatus includes an electrolytic cell having appropriate generator and sensory electrodes, and a D. C. power amplifier to vary the current input to the generator electrodes responsive to variations in the D. C. potential output of the detecting or sensor electrodes. A micro-coulometer or equivalent instrument serves to measure the magnitude of the current input and thus indirectly the content of the constituent being titrated.

As an example of the operation of an automatic "titrimeter" such as that described by Schaffer, air containing unknown amounts of mustard gas is introduced into the cell. Current supplied to the generating electrodes, immersed in an acidified potassium bromide electrolyte, generates bromine within the cell. The free bromine reacts in the cell with the mustard gas bubbling, with the air, through the electrolyte. The sensory electrodes serve to give a continuous measure of the unreacted bromine in the cell. By coupling the output of the sensory electrodes through a power amplifier to the generator electrodes, the current supplied to the latter is made to vary inversely as the bromine content varies. The milliammeter gives a continuous record of the current supplied to the generator electrodes, which record serves as a measure of the mustard content in the air passing through the cell.

Other applications of the apparatus are described by Schaffer in the aforementioned copending application and the present invention relates to any and all such applications as well as to the specific example given above.

In co-pending U. S. patent application, Serial No. 21,832, filed April 9, 1948, by Harold W. Washburn, improvements in the Schaffer apparatus relating particularly to the amplification and potential generating circuit are described. These improvements comprise incorporation of means in the circuit to convert the variable D. C. output voltage from the sensor electrodes into a corresponding A. C. voltage, means to amplify the A. C. voltage as produced, means for producing an alternating current which varies in accordance with variations in the A. C. voltage, and means for converting the alternating current into a corresponding direct current and for supplying the resultant direct current to generator electrodes. Such a circuit greatly reduces the tendency of the equipment to "drift" the drift being of objectionably large magnitude when employing D. C. amplification.

The present invention deals with improvements in the electrolytic cell particularly adapted for automatic titration in the manner described and in conjunction with either a D. C. amplification and control circuit as shown by Schaffer, or an A. C. converter-amplification circuit as described by Washburn. Because of improved results obtainable with the last named type of circuit, the cell of the present invention is described and illustrated with reference thereto, it being understood that it is not limited to use with such a circuit.

The electrolytic cell of the invention represents improvements over prior known cells for automatic titration with respect to improved electrode functioning, elimination of liquid surging and the "noise" consequent thereon, fluid flow control and other features which will become apparent from the following description.

The automatic titrating apparatus of the invention comprises a combination of an electrolytic cell including a first chamber and a second chamber in the latter of which quantitative reaction between the titrating agent and a fluid constituent to be measured takes place in an electrolyte in the presence of an electrode. Means are provided for introducing fluid containing the constituent in unknown amounts into the electrolyte in the second chamber and for exhausting fluid from the second chamber. The second chamber is constructed so as to cause the fluid passing therethrough to circulate the electrolyte therein. A generating electrode and a sensor electrode are disposed in the second chamber in the path of fluid flow, and a passageway is provided between the two chambers for controlled circulation of electrolyte therebetween. The aforementioned passageway preferably includes a filter for removing reaction products, unreactive and unreacted constituents from the electrolyte as it passes from the second chamber or cell to the first chamber or cell and is also provided with a generator electrode, preferably intermediate the second chamber and the filter. A sensor electrode is disposed in the first cell and due to the aforementioned filter is immersed in filtered electrolyte.

The apparatus also includes means for supplying a current to the generator electrodes responsive to variations in the potential of the sensor electrodes and means for measuring the current supplied to the generating electrodes. These last named means contemplate the circuits of either Schaffer or Washburn as described above.

The invention, and improvements consequent thereon, will be more clearly understood from the following detailed description thereof as taken with reference to the accompanying drawing in which:

Fig. 1 is a sectional elevation of an improved cell according to the invention including a block diagram of the associated sensing and generating circuit.

Fig. 2 is a section taken on the line 2—2 of Fig. 1;

Fig. 3 is a sectional elevation of the lower portion of the inner cell as taken on the line 3—3 of Fig. 2;

Figure 4:
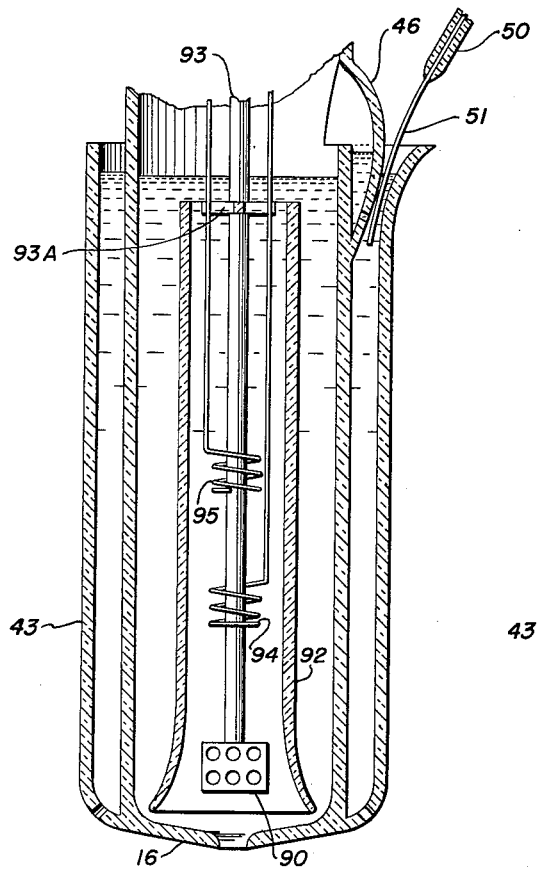
Fig. 4 is a sectional elevation of a second type of inner cell.

Referring to the drawing the cell 10 of the apparatus comprises an outer vessel 11, conveniently a glass jar, having a cover 12. The jar and cover are provided with annular lips 13, 14 respectively having ground adjoining faces for sealing the cover to the jar.

An inner cell 16 is sealed through the cover 12 and forms at its upper end a male portion 17 of a conventional ground glass joint. A female portion 18 of the joint supports a fluid inlet tube 20, projecting to a point near the bottom of the cell 16 and carrying a bubbler 22 at its lower end and an exhaust nipple 36. The bubbler 22 is preferably of the sintered glass type but a perforated bubbler is also satisfactory. The joint 18 also has sealed thereto electrode tubes 24, 25 having lead wires 26, 27 respectively extending therethrough and sealed through the bottom ends thereof in connection with electrodes 28, 29 respectively.

An inner chamber 16A of the cell 16 is divided vertically by baffles 32, 33 projecting radially from the lower end of the inlet tube 20 and fitting loosely into the inner cell 16. The purpose of the baffles 32, 33 is to induce a circulation of electrolyte within the inner cell, as a consequence of the flow of fluid from the bubbler 22 through the cell.

Fluid introduced into the cell through a tube 20 bubbles through the electrolyte therein and exhausts through the port 36. A vent 37 in the wall of the inner cell above the level of electrolyte 38 provides pressure equalization between the air spaces in the inner and outer cells. The inner cell is provided with a port 39 through the bottom thereof for electrolyte flow from the outer cell into the inner cell at a rate dependent upon the flow of the electrolyte from the inner cell to the outer cell in the manner hereinafter described.

An outer annular chamber 42 is formed around the inner chamber 16A of the cell 16 by a concentric cylindrical shell 43 surrounding the inner chamber. The wall of the cell 16 is enlarged at 46 to form a reservoir 46A with the upper end of the outer chamber 43. A port 47 at the lower part of the enlarged section 46 provides for liquid passage from the reservoir 46A to the outer chamber 42. An electrode tube 50 having a platinum electrode 51 sealed therethrough is sealed through the cover 12 by a conventional ground glass joint 52, so that the electrode is disposed in the annular chamber adjacent the port 47.

The rate of electrolyte circulation between the inner and outer cells through the annular chamber is determined by the size of the port 47. Although this size is not critical I have found that a port with a diameter of from 5 to 50 thousandths of an inch is satisfactory and that a diameter of about 20 thousandths of an inch appears optimum.

Liquid introduced into the reservoir 46A in the manner hereinafter described flows through the port 47 into the annular outer chamber 42, past the outer generating electrode 51, downwardly in the chamber and through ports 54, 55 formed in the bottom thereof into the outer cell. The lower portion of the chamber 42 is filled with a suitable absorbent 56 such as charcoal or the like which serves to absorb unreacted constituents from the electrolyte as it flows through the absorbent bed in passing from the inner to the outer cell.

An outer sensor electrode 60 is sealed to the cover 12 by a conventional ground glass joint 61 and includes a platinum electrode 62 extending through the lower end of a tube 63 which projects through the ground glass joint and carries a lead 62A. The outer sensor electrode 60 includes an outer shell 65 surrounding the lower end of the electrode tube 63 and having a port 68 through which electrolyte may flow into the electrode. The lower end of the shell 65 carries a pool 64 of mercury overlain by a layer of mercurous bromide-mercury paste which in turn is covered by electrolyte. A vent 69 in the upper portion of the shell above the water level equalizes the pressure between the electrode and outer shell.

Recent improvements in the circuit associated with automatic titration cells as described by George Turner in co-pending application, Serial No. 21,833, filed April 19, 1948, include temperature compensating network for compensating the sensor voltage for voltage variations due to changes in the temperature of the electrolyte in the cell. The cell of the invention is therefore provided with an auxiliary cell 70 in which a temperature compensating resistor may be immersed in the electrolyte and connected by a lead 72 to the amplification system. The provision of such temperature compensating means in association with the operating circuit forms no part of the present invention and detailed description thereof is omitted.

The conventional associated circuit as shown diagrammatically in Fig. 1 includes a power amplifier 74 connected to the output of the inner and outer sensor electrode by the leads 75, 76 respectively and delivering current by leads 77, 78 to the inner and outer generator electrodes respectively. A measuring instrument 80, such as a micro-coulometer, milliammeter, or the like in series in the input lead 77 serves to measure the current supplied to the generator electrode and thus serves as a measure of the constituent being titrated. As above mentioned the improved cell of the invention may be employed in conjunction with any of the associated amplification and power development circuits as shown by Schaffer, Washburn, or Turner in the co-pending applications hereinbefore identified.

The operation of the apparatus is essentially similar to the operation of the apparatus shown by Schaffer and is as follows:

When no mustard gas is being absorbed in the cell, i. e. when there is none in the entering air stream, the generating electrodes produce bromine from the acidified potassium bromide electrolyte at a very low constant rate. Thus "zero" current to the generating electrode and the amplifier output is adjusted to about 0.1 milliamperes when there is no mustard gas input, giving a small initial bromine excess. Bromine is formed within the inner cell at the generator anode 29 and partially swept out by the air stream.

When mustard gas is present in the entering air sample, it is forced to flow through the inner cell at a substantially constant rate—conveniently approximately 1 liter per minute—and it reacts quantitatively with the bromine formed at the generator anode to produce a change in the potential between the observing electrodes 28 and 50. The observing electrodes detect, potentiometrically, changes in the bromine concentration resulting from changes in the rate of addition of mustard gas.

The observed potential is applied to the input of the electronic power amplifier 74 and the change in the observed potential causes the amplifier to change the bromine generating current in the opposite direction, so that an increase in observed bromine concentration brings about a corresponding reduction in the rate of bromine generation. The power amplification of the amplifier is adequate to produce large current changes from very small changes in observed potential. Consequently, the intial bromine excess corresponding to "zero" current is restored quickly following any abrupt change in mustard gas concentration.

Since the change in the bromine measuring current is a direct measure of the change in the rate of consumption of bromine by the mustard gas, the record of the amplifier output is representative of the mustard gas concentration in the air sample.

Reference is now had to the specific elements of the improved cell of the invention and the functioning and effects of these elements. Although the several improvements have been combined in a single highly efficient cell, it will be apparent from the following discussion thereof that any one or combination thereof may be incorporated in a cell independently of the others.

The inner cell 16 is divided vertically by the baffles 32, 33 into two compartments so that bubbles of air emanating from the bubbler 22 form a rising stream in one compartment carrying liquid upwardly with the air. Liquid flows downwardly in the second compartment of this inner cell passing beneath and around the separating partition thereby completing a circulation cycle within the cell. Air rising from the liquid gas interface in the inner cell is discharged through the outlet 36 without passage through the outer cell.

This internal circulation in the inner cell promotes uniform flow both of air and circulating electrolyte. The uniformity of electrolyte circulation is important in eliminating surging of the electrolyte from the inner to the outer cell and conversely from the outer to the inner cell when bubble variations occur in the air flow. Since such surging of the electrolyte causes objectionable "noise" in the generating current the elimination of the surging is effective in eliminating this noise.

Another consequence of the internal circulation within the inner cell is the ability to place the inner electrodes in the stream of air bubbles which has a scrubbing effect resulting in more stable operation of the cell. The amount of fluctuation in the bromine generating current referred to above as "noise" is lower when the electrodes are placed in circulating electrolyte through which air bubbles are passing. Thus as shown in the drawing the inner sensor and generator electrodes 28, 29 are disposed in the right hand compartment of the inner cell in the path of the air stream emanating from the bubbler 22 so as to obtain full advantage of the scrubbing effect of the controlled air flow.

The location of the inner sensor and generator electrodes with respect to the air-liquid stream as well as with reference to each other has been found to be important. In this respect it has been found that the most stable low noise operation is obtained with the sensor electrodes placed in the up flow air-liquid stream with the plane of the platinum foil vertical, i. e. in the plane of the stream. As above mentioned, it appears that the bubbles scrub the electrode surface and thus reduce the effect of interfacial diffusion at the surface. Greatest efficiency of operation is obtained when the sensor electrode is placed near the bubbler and below the generating electrode as shown in Fig. 1 so that the sensor electrode responds to the lowest concentration of bromine in the cell, i. e. the bromine concentration of the liquid flowing downwardly in the left hand compartment and around the lower end of the baffles 32, 33.

Further with respect to these electrodes it has been found that the size of the sensor electrode 28 is of considerable importance. Thus with a very small platinum electrode such as .010" platinum wire the instrument is over sensitive—noise amplitude and frequency being extremely high. When platinum foil is attached to the electrode wire, noise in the generating current is reduced as the size of the foil is increased. However, the effect of a given area change in the electrode foil decreases as the total area increases. For this reason it has been found that a practical optimum operation is attained with a sensor electrode comprising a metal foil of approximately ½ sq. cm. in size depending from the end of the electrode wire.

As mentioned above variations in liquid level in either the inner or outer cell, i. e. surging of the liquid, results in objectionable noise in the generating circuit. One method of reducing this surging tendency as described comprises the division of the inner cell into compartments and the controlled circulation of electrolyte therein. An additional means of reducing the surging comprises control of the electrolyte circulation from the inner to the outer cell. This is accomplished in accordance with the present invention by the provision of the side reservoir 46A in the inner cell as hereinbefore described. A certain amount of electrolyte is entrained by the air stream, and separates therefrom in the space above the liquid level in the inner cell. A portion of the electrolyte thus separated serves to keep the side reservoir 46A filled as shown. The outlet 47 of the side reservoir is restricted so that flow of liquid therethrough is uniform. Without some such automatic flow circulation control means the liquid level becomes determinable largely by fluctuations in the air stream flowing through the inner cell. Placement of the outer generator electrode 51 adjacent the port 47 through which electrolyte passes from the inner cell to the annular outer chamber 42 confines hydrogen generation to this annular chamber. The generated hydrogen either escapes into the air space in the jar or, is carried in the electrolyte, and reacted with $Br_2$ present in the electrolyte or taken up by filter. Thus only a minor amount, if any, of hydrogen is present in the electrolyte in either the inner or outer cells eliminating interference which may be consequent upon its presence.

Liquid flowing from the reservoir 46A through the port 47 and downwardly in the annular outer chamber 42 is filtered in the filter 56 prior to issuance from the ports 54, 55 into the outer cell. By virtue of this construction flow through the filter is substantially uniform and the performance of the filter can be predetermined and maintained.

Since the electrolyte is filtered prior to circulating from the inner to the outer cell the outer sensor reference electrode 60 is immersed in filtered electrolyte and interference therewith by hydrogen is eliminated.

In prior practice the outer sensor reference electrode comprised a conventional calomel half-cell, i. e. a platinum wire immersed in mercurous chloride and mercury in potassium chloride solution—in contact with the cell electrolyte. In this type of electrode contact with the cell electrolyte is found undesirable and causes high drift due to diffusion between the potassium chloride solution and the cell electrolyte (acidified potassium bromide solution). The half cell reference sensor electrode incorporated in the cell of the present invention comprises platinum wire immersed in mercury the latter being overlain with a pasty mixture of mercurous bromide and mercury immersed in the cell electrolyte. This electrode has been found to be highly stable since diffusion problems are minimized, the only diffusion possible being that of mercurous ion at the very low concentration derived from mercurous bromide in a solution of potassium bromide. As above described, interference with the operation of this half-cell is also reduced by reason of the fact that the electrolyte in which it is immersed is substantially free of hydrogen and other unreacted contaminates.

Figure 5:
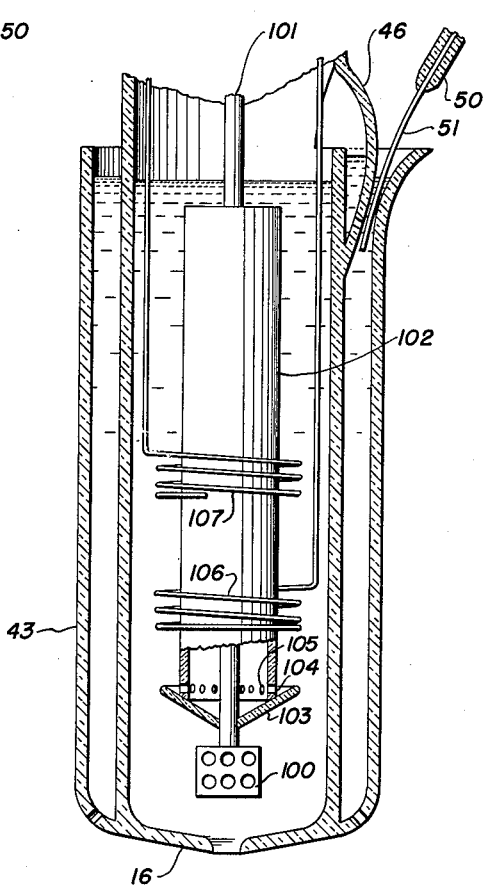
Fig. 5 is a sectional elevation of a third type of inner cell.

In Figs. 4 and 5 I have shown alternative embodiments of inner cell construction wherein controlled circulation, electrode scrubbing, etc., may be accomplished. Each of these embodiments comprises a cell 16 surrounded by an annular chamber 43 and having a side reservoir 46 opening from the cell into the outer chamber. To this extent the cells of Figs. 4 and 5 are the same as the cell shown in Figs. 1 to 3.

The cell of Fig. 4 is provided with a bubbler 90 supported at the lower end of a fluid inlet tube 93. A concentric bell bottom tube 92 is supported from the inlet tube by a spider 93A and divides the cell 16 into two substantially equal volume compartments. A sensing or observing electrode 94 and a generating electrode 95 are disposed within the tube 93 in the path of the fluid flowing upwardly from the bubbler.

As shown, the electrodes in this embodiment as well as in that of Fig. 5 may conveniently be platinum coils encircling the bubbler tube 93 (in Fig. 4). The preferred area of the sensor electrode as discussed above may be obtained by providing a series of fine wire coils replacing the platinum foil of the inner sensor electrode of Fig. 1.

The cell of Fig. 5 is provided with a bubbler 100 supported at the lower end of a fluid inlet tube 101. A concentric tube 102 is supported from the inlet tube by an inverted conical baffle 103 and is provided at its bottom end with a plurality of ports 104, 105, etc., adjacent the baffle. A sensor electrode 106 and a generating electrode 107 are disposed in the cell around the tube 102 in the path of the fluid passing upwardly from the bubbler.

The operation of each of these cells in conjunction with the rest of the apparatus is the same as that of the apparatus of Fig. 1 as described above. In each case circulation of electrolyte is induced by division of the cell into two compartments and causing the unknown fluid sample to flow upwardly in one or the other compartments.

The various elements of the improved cell design of the invention have been described in detail with reference to their function and the improved operation of the cell consequent thereon. It is of course within the contemplation of the invention to use these various elements independently or various combinations thereof independently. For example, the improved half cell sensor electrode may be employed in a conventional titration cell with improved results although the improvements resulting therefrom will not be as great when the half cell is immersed in unfiltered electrolyte.

Thus the improved sensor electrode and the liquid circulation control including pre-filtering before passage of electrolyte from the inner to the outer cell cooperate to result in improved operation to a degree not attainable by either individually.

Further as an example, the compartmental inner cell may be employed as such in conjunction with a conventional cell to provide improvements consequent upon controlled internal circulation incorporating therewith the controlled circulation between the inner and the outer cell. Similarly the annular filter chamber through which liquid passing from the inner to the outer cell must flow may be utilized with conventional inner cells as presently employed in titrimeter equipment.

It is thus apparent that the various features of the invention combine to effectuate improvements in electrolytic titration. However, each may be used individually and in conjunction with conventional equipment to produce a certain degree of improvement in the operation thereof. The improvement to be expected from each of the various features of the present cell may be predicted upon consideration as above described.

I claim:

1. Titrating apparatus comprising an electrolytic cell including an outer cell and an inner cell in which quantitative reaction between a titrating agent and a fluid constituent to be measured takes place in the presence of an electrolyte, means including a sintered glass bubbler for introducing the fluid containing the constituent into the electrolyte in the inner cell and for withdrawing the fluid from the inner cell, baffle means in the inner cell to cause fluid passage therethrough to circulate the electrolyte therein, an inner generating electrode and an inner sensor electrode in the inner cell, a passageway between the inner and outer cell for circulation of electrolyte therebetween, an outer generator electrode, an outer sensor electrode each disposed in the electrolyte outside the inner cell, and means for supplying a current to the generating electrodes responsive to variations in the potential of the sensor electrodes.

2. Titrating apparatus comprising an electrolytic cell including an outer and an inner cell in which quantitative reaction between a titrating agent and a fluid constituent to be measured takes place in the presence of an electrolyte, means for introducing the fluid containing the constituent into the electrolyte in the inner cell and for withdrawing the fluid from the inner cell, an inner generating electrode and an inner sensor electrode in the inner cell, a chamber between the inner and outer cells, a filter in the chamber through which electrolyte flowing from the inner to the outer cells must pass, the bottom of the inner cell being provided with a port for return flow of electrolyte from the outer to the inner cell, an outer generator electrode in the chamber, an outer sensor electrode in the outer cell, and means for supplying a current to the generating electrodes responsive to variations in the potential of the sensor electrode.

3. Titrating apparatus comprising an electrolytic cell including an outer cell and an inner cell in which quantitative reaction between a titrating agent and a fluid constituent to be measured takes place in the presence of an electrolyte, means for introducing the fluid containing the constituent into the electrolyte of the inner cell and for withdrawing the fluid from the inner cell, and inner generating electrode and an inner sensor electrode in the inner cell, a passageway between the inner and outer cell for circulation of electrolyte therebetween, an outer generator electrode in the passageway, a filter in the passageway between the inner cell and the outer cell, an outer sensor electrode in the outer cell, and means for supplying a current to the generating electrodes responsive to variations in the potential of the sensor electrodes.

4. Titrating apparatus comprising an electrolytic cell including an outer cell and an inner cell in which quantitative reaction between a titrating agent and a fluid constituent to be measured takes place in the presence of an electrolyte, means for introducing the fluid containing the constituent into the electrolyte in the inner cell and for withdrawing the fluid from the inner cell, an inner generating electrode and an inner sensor electrode in the inner cell, a passageway between the inner and outer cells for circulation of electrolyte therebetween, a filter in the passageway through which electrolyte flowing from the inner to the outer cell must pass, an outer generator electrode in the passageway between the inner cell and the filter, an outer sensor electrode in the outer cell, and means for supplying a current to the generating electrodes responsive to variations in the potential of the sensor electrodes.

5. Titrating apparatus comprising an electrolytic cell including an outer cell and an inner cell in which quantitative reaction between a titrating agent and a fluid constituent to be measured takes place in the presence of an electrolyte, means for introducing the fluid containing the constituent into the electrolyte in the inner cell and for withdrawing the fluid from the inner cell, means in the inner cell to cause fluid passage therethrough to circulate the electrolyte therein, an inner generating electrode and an inner sensor electrode in the inner cell in the path of the fluid flowing therein, a passageway between the inner and outer cells for circulation of the electrolyte therebetween, an outer generator electrode in the passageway between the inner cell and the outer cell, an outer sensor electrode in the outer cell, and means for supplying current to the generating electrodes responsive to variations in the potential of the sensor electrodes.

6. Titrating apparatus comprising an electrolytic cell including an outer cell and an inner cell in which quantitative reaction between a titrating agent and a fluid constituent to be measured takes place in the presence of an electrolyte, means for introducing the fluid containing the constituent into the electrolyte in the inner cell and for withdrawing the fluid from the inner cell, means in the inner cell to cause the fluid passage therethrough to circulate the electrolyte therein, an inner generating electrode and an inner sensor electrode in the inner cell in the path of the fluid flow therein, a passageway between the inner and outer cell for circulation of electrolyte therebetween, a filter in the passageway through which the electrolyte flowing from the inner to the outer cell must pass, a port in the bottom of the inner cell for return flow of electrolyte from the outer to the inner cell, an outer generator electrode in the passageway between the inner cell and the filter, an outer sensor electrode in the outer cell, means for supplying a current to the generating electrode responsive to variations in the potential of the sensor electrodes, and means for measuring the current supplied to the generating electrodes.

7. Apparatus according to claim 6 in which the means for introducing the fluid containing the constituent into the electrolyte in the inner cell comprises an inlet tube projecting lengthwise in the inner cell and terminating at the lower end of the inner cell in a bubbler, and the means in the inner cell to cause the fluid passage therethrough to circulate the electrolyte therein comprising baffles extending radially from the inlet tube and dividing the inner cell into two vertical compartments, so that the fluid flow in the inner cell is in only one of said compartments.

8. Apparatus according to claim 6 in which the means for introducing the fluid containing the constituent into the electrolyte in the inner cell comprises an inlet tube projecting lengthwise in the inner cell and terminating at the lower end of the inner cell in a bubbler, and the means in the inner cell to cause the fluid passage therethrough to circulate the electrolyte therein comprises an open ended tube mounted concentrically around the inlet tube and extending from below the bubbler to a point just below the electrolyte level in the cell.

9. Apparatus according to claim 6 in which the means for introducing the fluid containing the constituent into the electrolyte in the inner cell comprises an inlet tube projecting lengthwise in the inner cell and terminating at the lower end of the inner cell in a bubbler, and the means in the inner cell to cause the fluid passage therethrough to circulate the electrolyte therein comprises a tube mounted concentrically around the inlet tube and supported by an inverted conical baffle affixed to the inlet tube adjacent the bubbler, and a plurality of ports in the tube adjacent the baffle, the tube extending from the baffle upwardly to a point just below the electrolyte level in the cell.

10. Apparatus according to claim 6 wherein the passageway between the inner and outer cells for circulation of electrolyte therebetween comprises an annular chamber surrounding the inner cell, an opening in the inner cell above the level of the electrolyte therein and communicating with the annular chamber, and ports in the lower part of the annular chamber communicating with the outer cell.

11. Apparatus according to claim 6 wherein the filter in the passageway comprises a bed of absorbent charcoal.

12. An electrolytic cell adapted for use in automatic titration which comprises a container providing a reservoir for electrolyte, an inner cell disposed within the container and including an inner chamber and an annular chamber surrounding the inner chamber, a baffle in the inner chamber dividing the inner chamber into two substantially vertical sections, a bubbler disposed at the lower end of the inner chamber on the end of an inlet tube extending vertically through the cell, a first electrode disposed in the inner chamber within one of the sections above the bubbler, a second electrode disposed within the same section of the inner chamber above the first electrode, a reservoir in the wall of the inner chamber opening into the inner chamber above the electrolyte level and into the annular chamber below the electrolyte level, a third electrode disposed in the annular chamber adjacent the last named opening in the reservoir, the inner chamber and annular chamber opening at the bottom thereof into the container and an outer electrode immersed in the electrolyte in the container.

13. An electrolyte cell according to claim 12 wherein the first and fourth electrodes are sensor electrodes and the second and third electrodes are generating electrodes.

14. An electrolytic cell according to claim 12 wherein the first electrode is a sensor electrode and comprises a piece of platinum foil depending from the end of an electrode wire.

15. An electrolytic cell according to claim 12 wherein the first electrode is a sensor electrode and comprises a piece of platinum foil of approximately ½ sq. cm. in size depending from the end of the electrode wire.

16. Titrating apparatus comprising an electrolytic cell including a first chamber and a second chamber in which quantitative reaction between a titrating agent and a fluid constituent to be measured takes place in the presence of an electrolyte, means for introducing the fluid containing the constituent into the electrolyte in the second chamber and for withdrawing the fluid from the second chamber, a generating electrode and a sensor electrode in the second chamber, a first passageway between the two chambers, a filter in the first passageway through which electrolyte flowing from the second to the first chamber must pass, a second passageway between the two chambers for flow of fluid from the first to the second chamber, a generator electrode in the first passageway, a sensor electrode in the first chamber, and means for supplying a current to the generating electrodes responsive to variations in the potential of the sensor electrodes.

17. Titrating apparatus comprising an electrolytic cell including an outer cell and an inner cell in which quantitative reaction between a titrating agent and a fluid constituent to be measured takes place in the presence of an electrolyte, means including a sintered glass bubbler for introducing the fluid containing the constituent into the electrolyte in the inner cell and for withdrawing the fluid from the inner cell, an inner generating electrode and an inner sensor electrode in the inner cell, a passageway between the inner and outer cell for circulation of electrolyte therebetween, an outer generator electrode in the passageway and an outer sensor electrode in the outer cell, means for supplying a current to the generating electrodes responsive to variations in the potential of the sensor electrodes and means for measuring the current supplied to the generating electrodes.

18. Titrating apparatus comprising an electrolytic cell including an outer cell and an inner cell in which quantitative reaction between a titrating agent and a fluid constituent to be measured takes place in the presence of an electrolyte, means including a sintered glass bubbler for introducing the fluid containing the constituent into the electrolyte in the inner cell and for withdrawing the fluid from the inner cell, means in the inner cell to cause fluid passage therethrough to circulate the electrolyte therein, an inner generating electrode and an inner sensor electrode in the inner cell in the path of the fluid flowing therein, a passageway between the inner and outer cells for circulation of the electrolyte therebetween, an outer generating electrode in the passageway between the inner cell, and means for supplying current to the generating electrodes responsive to variations in the potential of the sensor electrodes.

19. Titrating apparatus comprising an electrolytic cell including an outer cell and an inner cell in which quantitative reaction between a titrating agent and a fluid constituent to be measured takes place in the presence of an electrolyte comprising an acidified solution of potassium bromide, means for introducing the fluid containing the constituent into the electrolyte in the inner cell and for withdrawing the fluid from the inner cell, means in the inner cell to cause the fluid passing therethrough to circulate the electrolyte therein, a chamber between the inner and outer cell for circulation of electrolyte therebetween, a filter in the chamber through which the electrolyte flowing from the inner to the outer cell must pass, the inner cell having a port in the bottom thereof for return flow of electrolyte from the outer to the inner cell, an outer generating electrode in the chamber between the inner cell and the filter, an outer sensor electrode in the outer cell, means for supplying a current to the generating electrodes responsive to variations in the potential of the sensor electrodes and means for measuring the current supplied to the generating electrodes.

20. Apparatus according to claim 19 wherein the outer sensor electrode comprises an electrode disposed in a shell immersed in the electrolyte in the outer cell and having an opening therein for continuity of electrolyte between the outer cell and the inside of the shell, a pool of mercury in the shell in which the electrode is immersed, a paste comprising mercury, mercurous bromide, and electrolyte overlying the pool of mercury and in contact with the cell electrolyte.

21. Titrating apparatus comprising an electrolytic cell including an outer cell and an inner cell containing electrolyte in which quantitative reaction between a titrating agent and a fluid constituent to be measured take place, means for introducing the fluid containing the constituent into the electrolyte in the inner cell and for withdrawing the fluid from the inner cell, an inner generator electrode and an inner sensor electrode in the inner cell, a chamber between the inner and outer cells for flow of electrolyte from the inner to the outer cell, the inner cell being provided with a port opening into the chamber and this port being located in its entirety above the level of the electrolyte in the inner cell so that the only electrolyte entering the chamber is that carried above the electrolyte level by entrainment in the fluid, an outer generator electrode and an outer sensor electrode in the outer cell, and means for supplying current to the generator electrodes responsive to variations in the potential of the sensor electrodes.

ROBERT R. AUSTIN.

REFERENCES CITED

The following references are of record in the file of this patent:

UNITED STATES PATENTS

| Number | Name | Date |
|---|---|---|
| 1,253,615 | McElroy | Jan. 15, 1918 |
| 2,473,161 | McBee et al. | June 14, 1949 |